(12) United States Patent
Song et al.

(10) Patent No.: US 10,526,797 B2
(45) Date of Patent: Jan. 7, 2020

(54) COMPOSITE BAMBOO FLOOR AND MANUFACTURING METHOD THEREOF

(71) Applicant: Zhejiang Yongyu Bamboo Joint-Stock Co., Ltd., Huzhou, Zhejiang Province (CN)

(72) Inventors: Jiangang Song, Huzhou (CN); Yongxing Chen, Huzhou (CN); Fuqing Liu, Huzhou (CN); Yi Huang, Huzhou (CN)

(73) Assignee: ZHEJIANG YONGYU BAMBOO JOINT-STOCK CO., LTD., Huzhou (CN)

( * ) Notice: Subject to any disclaimer, the term of this patent is extended or adjusted under 35 U.S.C. 154(b) by 0 days.

(21) Appl. No.: 15/257,962

(22) Filed: Sep. 7, 2016

(65) Prior Publication Data

US 2017/0356193 A1 Dec. 14, 2017

(30) Foreign Application Priority Data

Jun. 14, 2016 (CN) .......................... 2016 1 0412198

(51) Int. Cl.
*E04F 15/04* (2006.01)
*E04F 15/02* (2006.01)
(Continued)

(52) U.S. Cl.
CPC .............. *E04F 15/048* (2013.01); *B32B 3/10* (2013.01); *B32B 3/14* (2013.01); *B32B 5/024* (2013.01); *B32B 5/26* (2013.01); *B32B 7/04* (2013.01); *B32B 9/02* (2013.01); *B32B 21/02* (2013.01); *B32B 21/10* (2013.01); *B32B 21/14* (2013.01); *B32B 37/06* (2013.01); *B32B 37/10* (2013.01); *B32B 38/04* (2013.01);
(Continued)

(58) Field of Classification Search
CPC .......... E04F 15/048; E04F 2015/02083; E04F 15/022; E04F 15/04; E04F 15/041; E04F 15/042; E04F 2201/0107; B32B 3/14; B32B 9/02; B32B 37/06; B32B 37/10; B32B 38/04
USPC .................................. 52/390, 588.1
See application file for complete search history.

(56) References Cited

U.S. PATENT DOCUMENTS 3,476,634 A * 11/1969 Fleischmann ........... B29C 44/12
156/275.5
3,579,941 A * 5/1971 Tibbals ................. E04F 15/022
52/384

(Continued)

*Primary Examiner* — Theodore V Adamos
(74) *Attorney, Agent, or Firm* — NK Patent Law

(57) ABSTRACT

The invention relates to a bamboo floor, in particular to a composite bamboo floor. The composite bamboo floor comprises a floor surface board provided with a body, a pressed surface, a connecting surface connected with the core board, at least one cut surface board side face and surface board end faces, and the core board arranged under the floor surface board and provided with a core board surface connected with the floor surface board, a core board bottom surface, core board side faces and core board end faces, and the positions of the core board side faces or the core board side faces and the surface board side faces are provided with notch structures processed in two sides in the length direction of the composite bamboo floor. The composite bamboo floor is high in strength, high in processing efficiency and low in production cost.

3 Claims, 8 Drawing Sheets

(51) Int. Cl.
  *B32B 21/02* (2006.01)
  *B32B 21/10* (2006.01)
  *B32B 21/14* (2006.01)
  *B32B 5/26* (2006.01)
  *B32B 7/04* (2019.01)
  *B32B 3/10* (2006.01)
  *B32B 5/02* (2006.01)
  *B32B 3/14* (2006.01)
  *B32B 9/02* (2006.01)
  *B32B 37/06* (2006.01)
  *B32B 37/10* (2006.01)
  *B32B 38/04* (2006.01)
  *B32B 38/16* (2006.01)

(52) U.S. Cl.
  CPC ...... *E04F 15/02038* (2013.01); *E04F 15/042* (2013.01); *B32B 2038/045* (2013.01); *B32B 2038/166* (2013.01); *B32B 2250/02* (2013.01); *B32B 2260/023* (2013.01); *B32B 2260/046* (2013.01); *B32B 2262/062* (2013.01); *B32B 2262/065* (2013.01); *B32B 2262/103* (2013.01); *B32B 2307/51* (2013.01); *B32B 2307/54* (2013.01); *B32B 2307/732* (2013.01); *B32B 2309/02* (2013.01); *B32B 2309/04* (2013.01); *B32B 2309/12* (2013.01); *B32B 2317/16* (2013.01); *B32B 2317/18* (2013.01); *B32B 2398/10* (2013.01); *B32B 2419/00* (2013.01); *B32B 2419/04* (2013.01); *B32B 2471/00* (2013.01); *E04F 2201/0107* (2013.01)

(56) References Cited

U.S. PATENT DOCUMENTS

| | | | | |
|---|---|---|---|---|
| 5,117,603 | A * | 6/1992 | Weintraub | E04F 15/04 52/390 |
| 5,441,786 | A * | 8/1995 | Manassa | B32B 3/14 428/318.4 |
| 5,755,068 | A * | 5/1998 | Ormiston | B32B 3/30 428/167 |
| 2002/0152701 | A1* | 10/2002 | Zhang | B32B 3/10 52/390 |
| 2003/0143360 | A1* | 7/2003 | Dauplay | B32B 9/02 428/54 |
| 2004/0226243 | A1* | 11/2004 | Lin | B32B 3/10 52/384 |
| 2007/0031630 | A1* | 2/2007 | Chu | B32B 3/14 428/54 |
| 2007/0062153 | A1* | 3/2007 | Li | B32B 3/06 52/796.1 |
| 2007/0193179 | A1* | 8/2007 | Risi | B32B 3/12 52/591.4 |
| 2008/0141611 | A1* | 6/2008 | Chen | B27M 3/0053 52/592.1 |
| 2010/0015389 | A1* | 1/2010 | Zhang | B27J 1/00 428/106 |
| 2010/0258243 | A1* | 10/2010 | Lin | B27J 1/003 156/259 |
| 2011/0045243 | A1* | 2/2011 | Dossche | B27N 3/00 428/141 |
| 2012/0015131 | A1* | 1/2012 | Akarsu | B27M 3/006 428/54 |
| 2017/0239836 | A1* | 8/2017 | Zhan | B27K 3/52 |

* cited by examiner

COMPOSITE BAMBOO FLOOR AND MANUFACTURING METHOD THEREOF

CROSS-REFERENCE TO RELATED APPLICATIONS

This application claims priority to Chinese Patent Application No. 201610412198.3 filed on Jun. 14, 2016, which is incorporated herein by reference in its entirety.

BACKGROUND OF THE INVENTION

Technical Field

The invention relates to a bamboo floor, in particular to a composite bamboo floor.

Description of Related Art

China is a country with large bamboo resources and has a high bamboo yield and a long bamboo utilization history, and bamboo products are abundant. The bamboo products have the advantages of good toughness and high strength and are made into raw materials for indoor floors, outdoor floors, furniture and the like on the market. However, the bamboo products contain a large amount of sugar and protein and are rich in content, accordingly the bamboo products are very likely attacked or corroded by bamboo rot fungi; existing lignin, hemicellulose and cellulose make the size stability of recombined bamboo materials poor.

For solving the technical problems, a Chinese patent with the patent number CN204876310U (2015 Dec. 16) discloses a carbonized bamboo-wood fiber and bamboo filament composite cement board, but the product still needs to be improved on the aspects of appearance, usage feelings and processing time.

BRIEF SUMMARY OF THE INVENTION

The first purpose of the invention is to provide a composite bamboo floor good in stability, short in processing time and low in cost.

The second purpose of the invention is to provide a manufacturing method of the composite bamboo floor good in stability, short in processing time and low in cost.

The first technical purpose of the invention is achieved by adopting the following technical scheme:

A composite bamboo floor comprises a floor surface board formed by jointly curing a first thermosetting resin and multiple bamboo fiber strips and a core board arranged under the floor surface board;

the floor surface board is provided with a body, a pressed surface exposed for showing bamboo joint shapes, a connecting surface connected with the core board, at least one surface board side face formed through cutting and surface board end faces;

the core board is provided with a core board surface connected with the floor surface board, a core board bottom surface opposite to the core board surface, core board side faces parallel to or connected with the surface board side faces and core board end faces parallel to or connected with the surface board end faces;

the positions where the core board side faces are located or the positions where the core board side faces and the surface board side faces are located of the composite bamboo floor are provided with notch structures processed in two sides in the length direction of the composite bamboo floor.

The composite bamboo floor is provided with at least one side-cut surface, also has natural bamboo texture, shows the bamboo joint shaped surface and is high in strength and high in processing efficiency. The composite bamboo floor is provided with at least one side-cut surface, so that the saw line loss of boards cut by adopting a crosscut saw in the prior art is reduced by about 40%, the cost is reduced, and the whole production cost can be reduced by about 70%.

Preferably, the multiple bamboo fiber strips are arranged in an approximate parallel mode, multiple bamboo fiber strip connecting pieces across the multiple bamboo fiber strips and having their strength in the direction non-parallel to the bamboo fiber strips are arranged in the floor surface board, and the bamboo fiber strip connecting pieces are arranged in the vertical direction of one or more adjacent bamboo fiber strips in a staggered mode.

The approximate parallel modes include a parallel mode and an approximate parallel mode. Due to the fact that each bamboo fiber strip is in a natural shape, complete paralleling is difficult to achieve during actual arrangement.

The transverse penetrations include horizontal penetration and/or penetration of the bamboo fiber strips inclining at the angles smaller than a right angle.

The bamboo fiber strips are woven and arranged into the woven bamboo fiber strip curtains through bamboo fiber strip connecting pieces, the laying efficiency can be greatly improved, meanwhile the strength of the floor surface board can be improved, accordingly the thickness of the floor surface board can be further decreased, the processing efficiency can be improved, and the cost can be greatly reduced.

Preferably, the thickness of the floor surface board is 2 to 5 mm.

Compared with the surface layer thickness of an existing composite bamboo floor, the thickness of the floor surface board is decreased, and the cost can be greatly reduced.

Preferably, the thickness of the bamboo fiber strips is 1 to 4 mm, and the width of the bamboo fiber strips is 1 to 99 mm.

The width and the thickness of the bamboo fiber strips are small, the finally-manufactured floor can be finer in texture, the follow-up gum dipping and hot-pressing time can be shortened, accordingly the processing efficiency is improved, and the cost is reduced. The bamboo fiber strips can be manufactured through the working procedures of raw bamboo obtaining, cutting off, hacking, removal of the outer green and yellow of bamboos, carbonization, defibering and drying, different bamboo joint shapes can be shown according to the forms of the raw materials, and accordingly the floor surface board has the natural bamboo texture and shows the bamboo joint shaped surface.

Preferably, a first thermosetting resin layer or a second thermosetting resin layer is arranged between the floor surface board and the core board; or the first thermosetting resin layer or a second thermosetting resin layer is arranged between the floor surface board and the core board and the floor base board.

The thermosetting resin arranged between the floor surface board and the core board can be the same as or different from the thermosetting resin arranged between the biomass material core board and the base board. When their thermosetting resins are different, different types of thermosetting resins having good mutual fusion properties during hot pressing should be selected.

Preferably, the first thermosetting resin layer or the second thermosetting resin layer is phenolic resin glue, melamino-formaldehyde resin, urea resin or melamine modified urea resin.

Preferably, a preparation method of the melamine modified urea resin (modified MUF adhesive) comprises the steps:

A. weighing 100 parts by weight of a formaldehyde water solution with the mass concentration of 36.5% to 37.4%, 0.1-0.5 part by weight of an alkali matter solution with the mass concentration of 30% to 50% and 0.3-0.6 part of amino-terminated hyperbranched polymer PAMAM, putting the materials into a reaction kettle, and starting to perform stirring;

B. adding 1-4 parts by weight of phosphonitrilic chloride trimer, performing heating to reach 50 to 55 degrees C., automatically raising the temperature to 75 to 85 degrees C., adding 35-55 parts of the melamine, continuing to raise the temperature to 90 to 95 degrees C., and performing a reaction to obtain a preliminary condensation polymer;

C. adding 40-45 parts of the melamine and 0.6-0.9 part of para toluene sulfonamide in the preliminary condensation polymer to obtain a second condensation polymer;

D. adding 20-30 parts of urea when cooling the second condensation polymer to 70 to 75 degrees C., continuing to perform the reaction for 8 to 12 min, and obtaining glue when cooling the temperature to 30 to 50 degrees C.

The invention adopts the para toluene sulfonamide and the amino-terminated hyperbranched polymer PAMAM for modification, the urea, the melamine and the formaldehyde are added in a fractionated and staged mode, multi-time feeding is performed to enable the intermediate content of the modified MUF resin adhesive in the preparation process to be maximum, accordingly the strength and abrasion resistance of the board can be improved, and the service life of the board can be prolonged. The MUF resin is modified by utilizing a large amount of reactive functional groups in amino-terminated hyperbranched polymer PAMAM molecules and the highly-branched characteristics of its structure, so that the performance of the resin is improved, the stability is improved, and the free formaldehyde emission is effectively controlled; the formaldehyde emission of engineered wood processed by adopting the modified MUF adhesive is less than 0.2 mg/L and reaches the Japanese F☆☆☆☆ standard.

Preferably, the core board is a biomass material core board selected from a fiber board, a particle board, an engineered wood veneer or woven fir strip curtains or woven bamboo fiber strip curtains with blocky structures and having thickness. The selected biomass material core board facilitates follow-up hot-pressing manufacture.

Preferably, a floor base board is further arranged under the biomass material core board and is a log veneer base board or a floor base board formed by jointly curing a first thermosetting resin and bamboo fiber strips.

If bamboo fiber strips are hot-pressed on both the front side and the back side, the stability of the composite bamboo floor can be further improved.

Preferably, the floor base board is the hot-pressed woven bamboo fiber strip board, the bamboo fiber strip connecting pieces having their strength in the direction non-parallel to the bamboo fiber strips are arranged on the hot-pressed woven bamboo fiber strip board, and the bamboo fiber strip connecting pieces are arranged in the vertical direction of one or more adjacent bamboo fiber strips in a staggered mode.

The bamboo fiber strips are woven and arranged into the woven bamboo fiber strip curtains through bamboo fiber strip connecting pieces, the laying efficiency can be greatly improved, meanwhile the strength of the floor surface board can be improved, accordingly the thickness of the floor surface board can be further decreased, the processing efficiency can be improved, and the cost can be greatly reduced.

Preferably, the bamboo fiber strip connecting pieces are bamboo filaments, cotton threads or thin iron wires.

Preferably, the floor surface board is formed by hot-pressing one or more layers of woven bamboo floor strip curtains.

A manufacturing method of the composite bamboo floor comprises the following manufacturing steps:

(1) prefabricating the floor surface board: weaving the bamboo fiber strips with a thickness of 1 to 4 mm and a width of 1 to 99 mm into the woven bamboo fiber strip curtains through the bamboo fiber strip connecting pieces having their strength in the direction non-parallel to the bamboo fiber strips, and dipping the woven bamboo fiber strip curtains with the first thermosetting resin to obtain a prefabricated floor surface board;

(2) drying: feeding and drying the prefabricated floor surface board till the moisture content is 6% to 10% to obtain a dried floor surface board;

(3) manufacturing the core board;

(4) hot pressing: putting the dried floor surface board on the core board, performing hot pressing under the hot pressing pressure of 3 to 6 MPa/cm$^2$ and at the hot pressing temperature of 120 to 170 degrees C. for the hot pressing time of 10 to 20 min to obtain a hot-pressed woven bamboo fiber strip board;

(5) conditioning;

(6) side cutting: conducting slitting and width fixation on the side faces of the hot-pressed woven bamboo fiber strip board according to the required width of the composite bamboo floor;

(7) tenoning.

The bamboo fiber strips smaller in thickness are selected and are woven and arranged into the woven bamboo fiber strip curtains through the bamboo fiber strip connecting pieces, the laying efficiency can be greatly improved, meanwhile the strength of the floor surface board can be improved, the texture of the finally-manufactured floor is finer, and the follow-up gum dipping and hot-pressing time can be shortened. According to the invention, gum dipping comes before drying and hot pressing, hot-pressing parameters are controlled to enable the overall hot-pressing curing time to be shorter; drying and hot pressing are performed after gum dipping, and hot feeding and hot output can be executed during hot pressing. In the prior art, however, the bamboo strips larger in width are firstly dried generally, then the drying and hot pressing are performed, the hot-pressing time is long, only cold pressing and cold output can be executed during hot pressing, cold water cooling is needed after hot pressing, and blistering and layering do not occur in the cooling process. In addition, in the prior art, drying is needed to be performed again for water content control after hot pressing, so that the overall efficiency is low, and the production cost is high. The composite bamboo floor is further provided with the side-cut surfaces, so that the saw line loss of boards cut by adopting a crosscut saw in the prior art is reduced by about 40%. Therefore, the processing efficiency of the composite bamboo floor can be improved, the cost can be reduced. Furthermore, the floor surface board has the natural bamboo texture and shows the bamboo joint shaped surface.

After hot pressing is completed, the thickness of the floor surface board is 2 to 5 mm, the thickness of the core board is 4 to 6 mm, and the overall thickness of the composite bamboo floor is 9 to 15 mm.

Preferably, the width of the woven bamboo fiber strip curtains is 0.6 to 2 mm.

Generally, the width of the surface layer is about 10 cm during manufacture by adopting an existing process, the woven bamboo fiber strip curtains of the composite bamboo floor is at least 6 to 12 times wider than the curtains in the prior art and can be hot-pressed efficiently, the production time can be shortened by above 30% compared with the production time in the prior art, and the production efficiency is greatly improved.

Preferably, the hot-pressing speed in the step (4) is 1.2 to 1.6 min/mm.

During hot pressing, the hot-pressing blistering of the boards can be prevented by controlling the hot-pressing speed. Further preferably, the inventor further adopts an exhausting cushion net to drain moisture and steam during hot pressing so as to further prevent blistering and laying of the boards.

Preferably, the core board is a biomass material core board. The biomass material core board is manufactured by manufacturing a fiber board, a particle board, an engineered wood veneer or firstly weaving fir strip curtains or woven bamboo fiber strip curtains with blocky structures and having thickness, dipping the board with second thermosetting resin and then performing feeding and hot pressing.

Preferably, the bottom surface of the dried floor surface board or the top surface of the biomass material core board is coated with a first thermosetting resin or a second thermosetting resin before the dried floor surface board is put on the biomass material core board for hot pressing.

Preferably, the conditioning includes 3 to 7 days of hot stress release.

Preferably, the tenoning includes processing of notch structures on the two sides of the length direction of the bamboo floor.

In conclusion, the composite bamboo floor has the following advantages that:

1. The composite bamboo floor of the invention is provided with at least one side-cut surface, also has natural bamboo texture, shows the bamboo joint shaped surface and is high in strength and high in processing efficiency. The composite bamboo floor is provided with at least one side-cut surface, so that the saw line loss of boards cut by adopting a crosscut saw in the prior art is reduced by about 40%, the cost is reduced, and the whole production cost can be reduced by about 70%.

2. The bamboo fiber strips smaller in thickness and width are selected and are woven and arranged into the woven bamboo fiber strip curtains through the bamboo fiber strip connecting pieces, the laying efficiency can be greatly improved, meanwhile the strength of the floor surface board can be improved, the texture of the finally-manufactured floor is finer, and the follow-up gum dipping and hot-pressing time can be shortened. According to the invention, gum dipping comes before drying and hot pressing, hot-pressing parameters are controlled to enable the overall hot-pressing curing time to be shorter; drying and hot pressing are performed after gum dipping, and hot feeding and hot output can be executed during hot pressing, so that the overall efficiency is high, and the production cost is low.

DETAILED DESCRIPTION OF THE INVENTION

Figure 1:
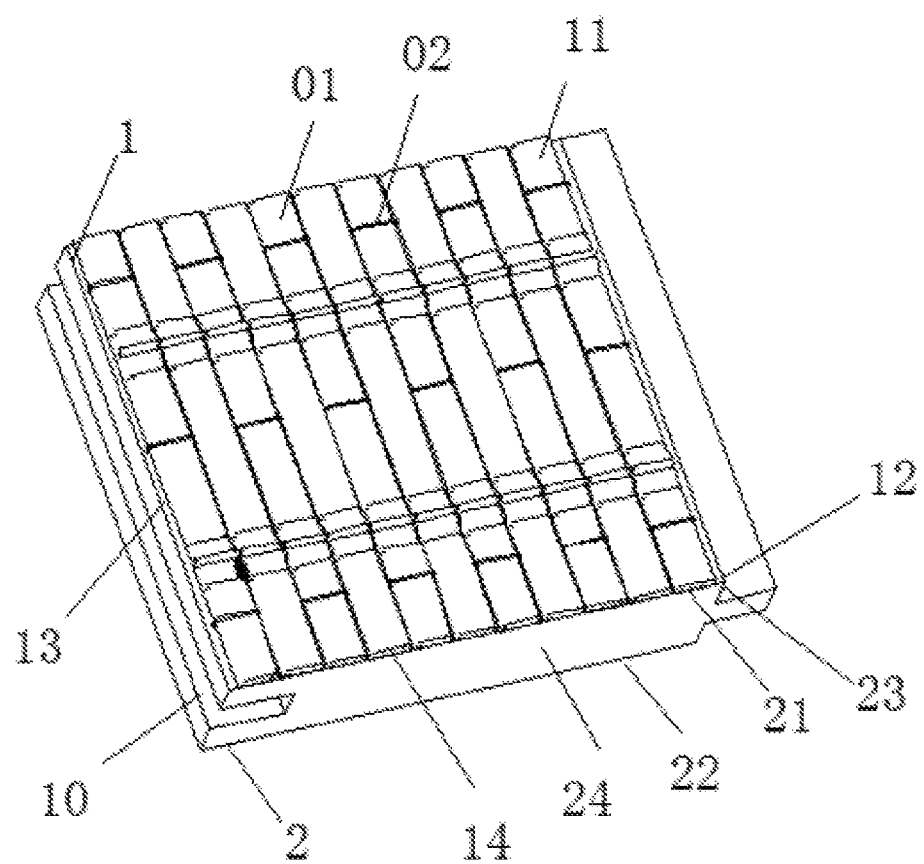
FIG. 1 is a schematic view of a composite bamboo floor with the double-layer structure where the bamboo fiber strip connecting pieces across the bamboo fiber strips and are arranged in the vertical direction of one adjacent bamboo fiber strip in a staggered mode of the invention.
Figure 2:
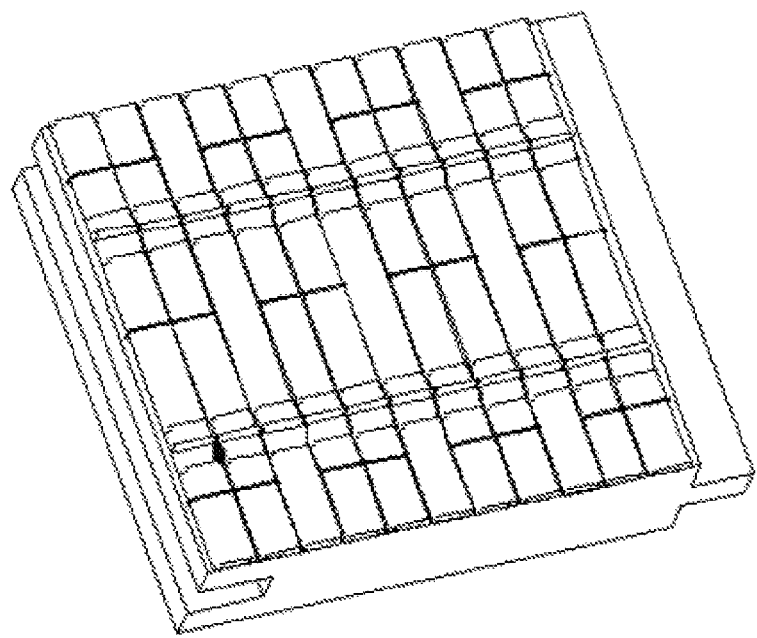
FIG. 2 is a structural schematic view of the composite bamboo floor with the double-layer structure where the bamboo fiber strip connecting pieces across the bamboo fiber strips and are arranged in the vertical direction of two adjacent bamboo fiber strips (at an interval of one strip) in a staggered mode of the invention.
Figure 3:
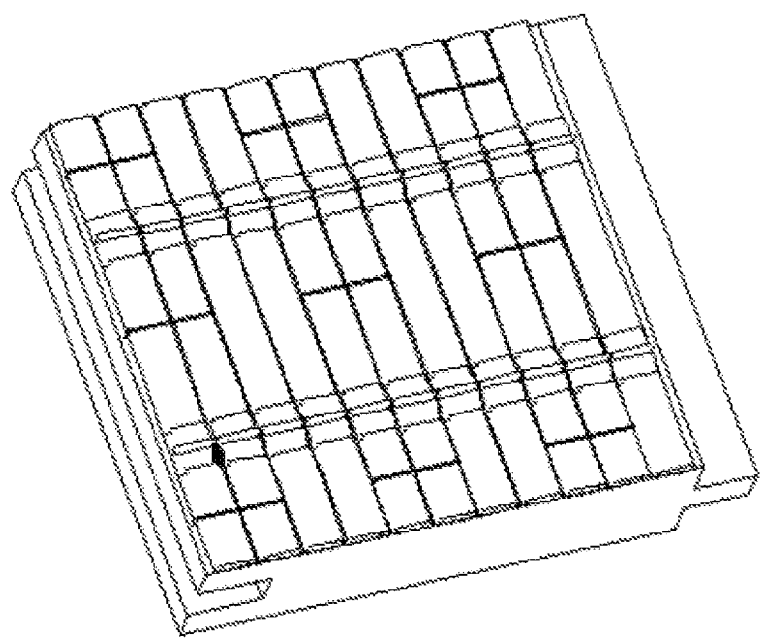
FIG. 3 is a structural schematic view of the composite bamboo floor with the double-layer structure that the bamboo fiber strip connecting pieces across the bamboo fiber strips and are arranged in the vertical direction of two adjacent bamboo fiber strips (at an interval of two strip) in a staggered mode of the invention.
Figure 4:
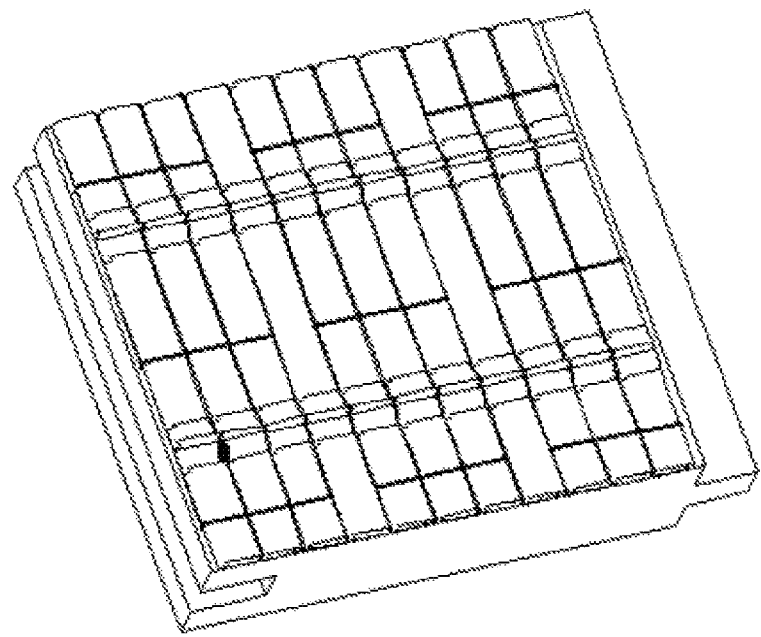
FIG. 4 is a structural schematic view of the composite bamboo floor with the double-layer structure where the bamboo fiber strip connecting pieces across the bamboo fiber strips and are arranged in the vertical direction of three adjacent bamboo fiber strips (at an interval of one strip) in a staggered mode of the invention.
Figure 5:
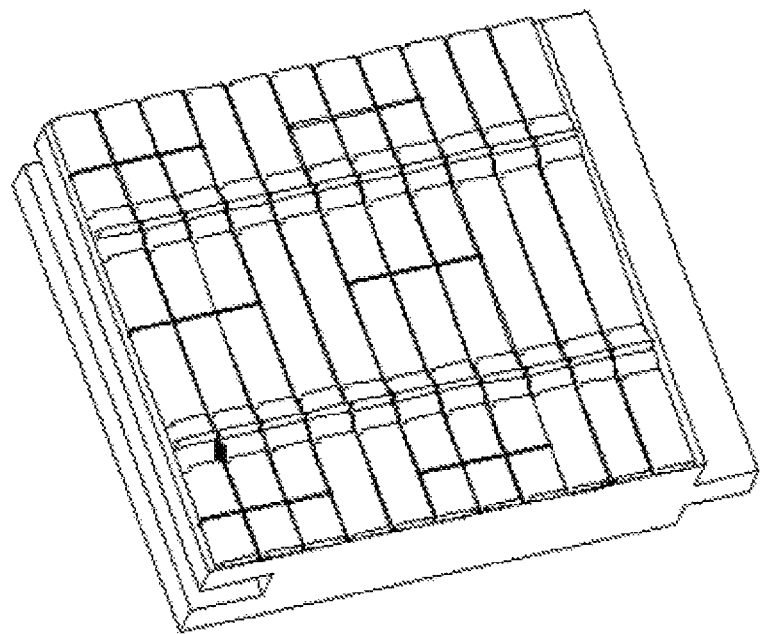
FIG. 5 is a structural schematic view of the composite bamboo floor with the double-layer structure where the bamboo fiber strip connecting pieces across the bamboo fiber strips and are arranged in the vertical direction of three adjacent bamboo fiber strips (at an interval of two strips) in a staggered mode of the invention.
Figure 6:
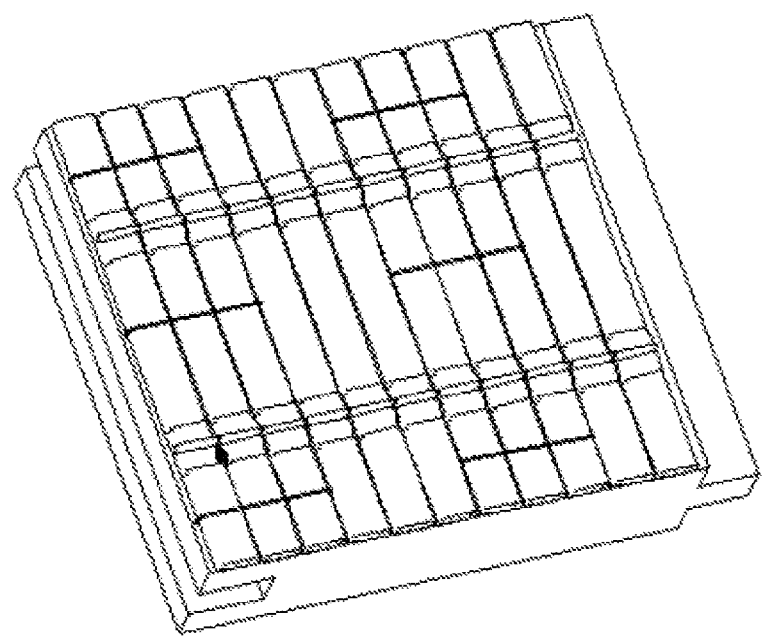
FIG. 6 is a structural schematic view of the composite bamboo floor with the double-layer structure where the bamboo fiber strip connecting pieces across the bamboo fiber strips and are arranged in the vertical direction of three adjacent bamboo fiber strips (at an interval of three strips) in a staggered mode of the invention.
Figure 7:
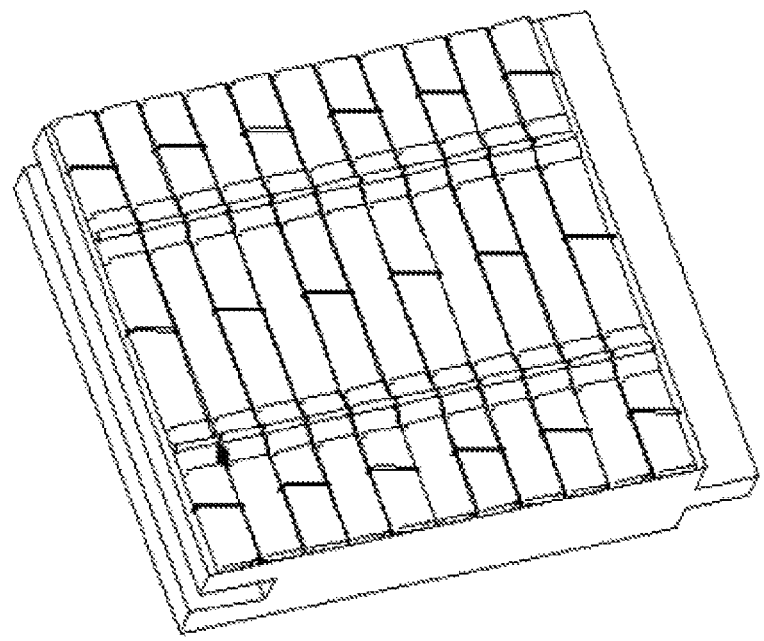
FIG. 7 is a structural schematic view of the composite bamboo floor with the double-layer structure where the bamboo fiber strip connecting pieces obliquely penetrate through the bamboo fiber strips and are arranged in the vertical direction of one adjacent bamboo fiber strip (at an interval of one strip) in a staggered mode of the invention.
Figure 8:
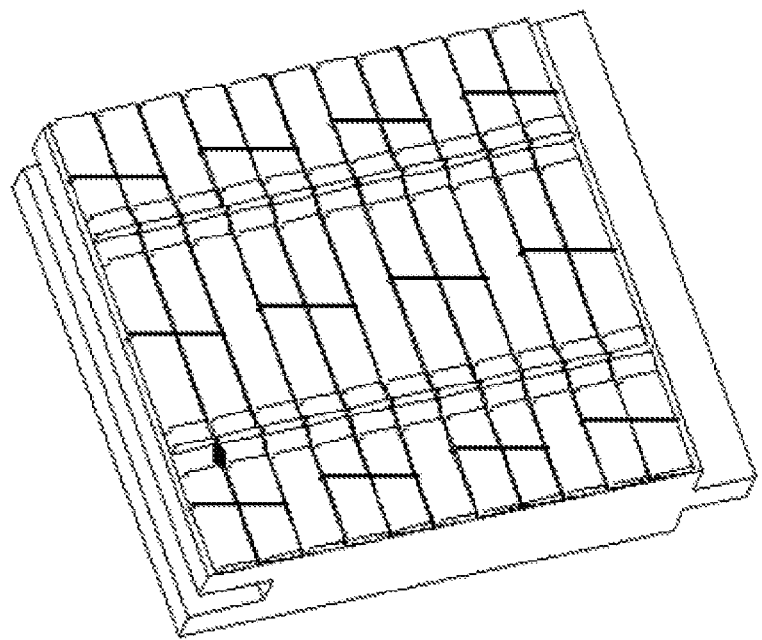
FIG. 8 is a structural schematic view of the composite bamboo floor with the double-layer structure where the bamboo fiber strip connecting pieces obliquely penetrate through the bamboo fiber strips and are arranged in the vertical direction of two adjacent bamboo fiber strips (at an interval of one strip) in a staggered mode of the invention.
Figure 9:
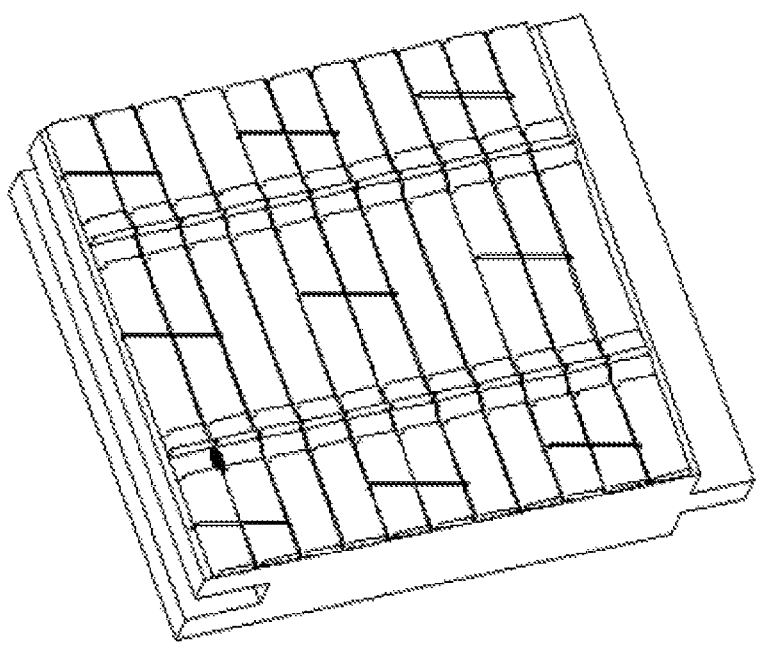
FIG. 9 is a structural schematic view of the composite bamboo floor with the double-layer structure where the bamboo fiber strip connecting pieces obliquely penetrate through the bamboo fiber strips and are arranged in the vertical direction of two adjacent bamboo fiber strips (at an interval of two strips) in a staggered mode of the invention.
Figure 10:
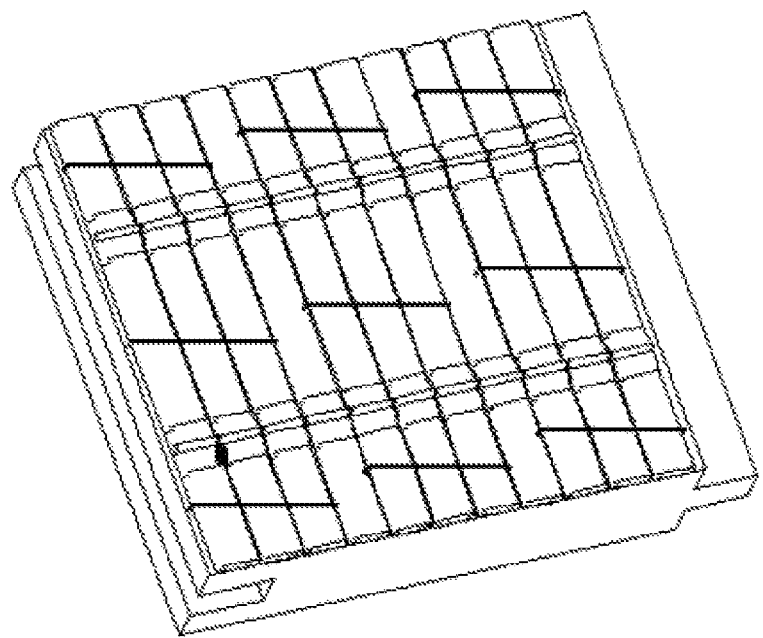
FIG. 10 is a structural schematic view of the composite bamboo floor with the double-layer structure where the bamboo fiber strip connecting pieces obliquely penetrate through the bamboo fiber strips and are arranged in the vertical direction of three adjacent bamboo fiber strips (at an interval of one strip) in a staggered mode of the invention.
Figure 11:
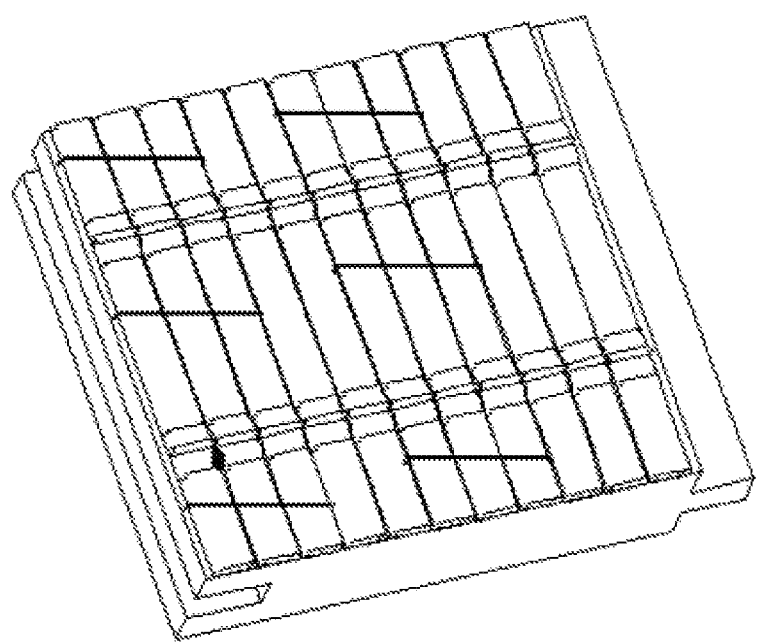
FIG. 11 is a structural schematic view of the composite bamboo floor with the double-layer structure where the bamboo fiber strip connecting pieces obliquely penetrate through the bamboo fiber strips and are arranged in the vertical direction of three adjacent bamboo fiber strips (at an interval of two strips) in a staggered mode of the invention.
Figure 12:
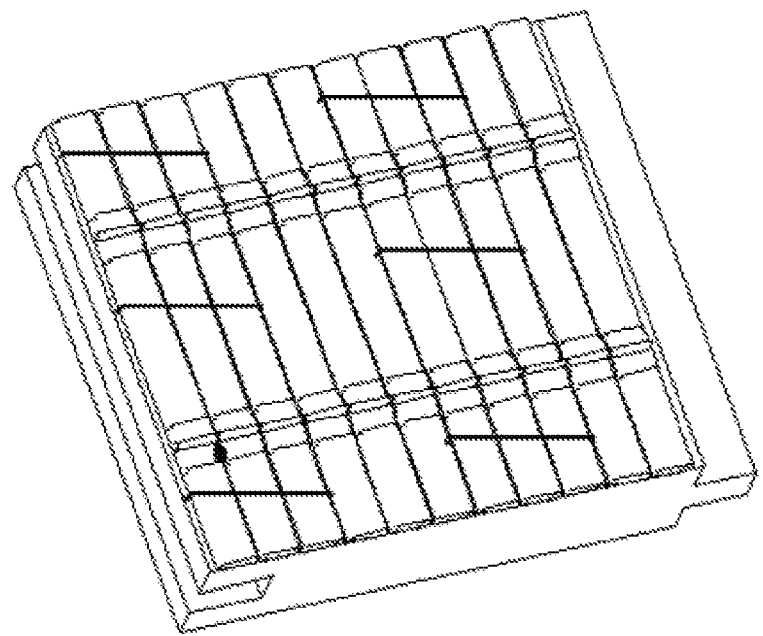
FIG. 12 is a structural schematic view of the composite bamboo floor with the double-layer structure where the bamboo fiber strip connecting pieces obliquely penetrate through the bamboo fiber strips and are arranged in the vertical direction of three adjacent bamboo fiber strips (at an interval of three strips) in a staggered mode of the invention.

As shown in FIG. 1-14, the composite bamboo floor comprises a floor surface board 1 formed by jointly curing a first thermosetting resin and multiple bamboo fiber strips 01 and a core board 2 arranged under the floor surface board; the floor surface board is provided with a body 10, a pressed surface 11 exposed for showing bamboo joint 110 shapes, a connecting surface 12 connected with the core board, at least one surface board side face 13 formed through cutting and surface board end faces 14.

The core board 2 is provided with a core board surface 21 connected with the floor surface board, a core board bottom surface 22 opposite to the core board surface 21, core board side faces 23 parallel to the surface board side faces 13 and core board end faces 24 parallel to the surface board end faces 14; the positions where the core board side faces 23 are located or the positions where the core board side faces 23 and the surface board side faces 13 are located of the composite bamboo floor are provided with notch structures 10 processed in two sides in the length direction of the composite bamboo floor.

As shown in FIG. 1-12, multiple bamboo fiber strips 01 are arranged in an approximate parallel mode, the bamboo fiber strip connecting pieces 02 across the multiple bamboo fiber strips 01 and having their strength in the direction non-parallel to the bamboo fiber strips 01 are arranged in the floor surface board 1, and the bamboo fiber strip connecting pieces 02 are arranged in the vertical direction of one or more adjacent bamboo fiber strips 01 in a staggered mode. The transverse penetrations include horizontal penetration and/or penetration of the bamboo fiber strips inclining at the angles smaller than a right angle.

For making the texture of the finally-manufactured floor finer, shortening the follow-up gum dipping and hot-pressing time so as to improve the processing efficiency and reduce the cost, and for enabling the floor surface board to have the natural bamboo texture and show the bamboo joint shaped surface, the width and the thickness of the bamboo fiber strips are decreased, the thickness of the bamboo fiber strips is controlled to be 1 to 4 mm, the width of the bamboo fiber strips is controlled to be 1 to 99 mm, and the thickness of the floor surface board 1 is 2 to 5 mm.

The floor surface board 1 is the hot-pressed woven bamboo fiber strip curtain board formed by hot-pressing one or more layers of woven bamboo fiber strip curtains. The core board 2 is the biomass material core board from a fiber board, a particle board, an engineered wood veneer or woven fir strip curtains or woven bamboo fiber strip curtains with blocky structures and having thickness.

As shown in FIG. 1-6, the bamboo fiber strip connecting pieces across the bamboo fiber strips and are perpendicular to the bamboo fiber strips, the bamboo fiber strip connecting pieces 02 are arranged in the vertical direction of one or more adjacent bamboo fiber strips 01 in a staggered mode, for example one, two or three woven bamboo fiber strips at an interval of one, two or three strips.

As shown in FIG. 7-12, the bamboo fiber strip connecting pieces obliquely penetrate through the bamboo fiber strips, the included angles formed by the bamboo fiber strip connecting pieces and the bamboo fiber strips are smaller than 90 degrees, the bamboo fiber strip connecting pieces 02 are arranged in the vertical direction of one or more adjacent bamboo fiber strips 01 in a staggered mode, for example one, two or three woven bamboo fiber strips at an interval of one, two or three strips. The bamboo fiber strip connecting pieces 02 can be selected from bamboo filaments, cotton threads or thin iron wires.

Figure 13:
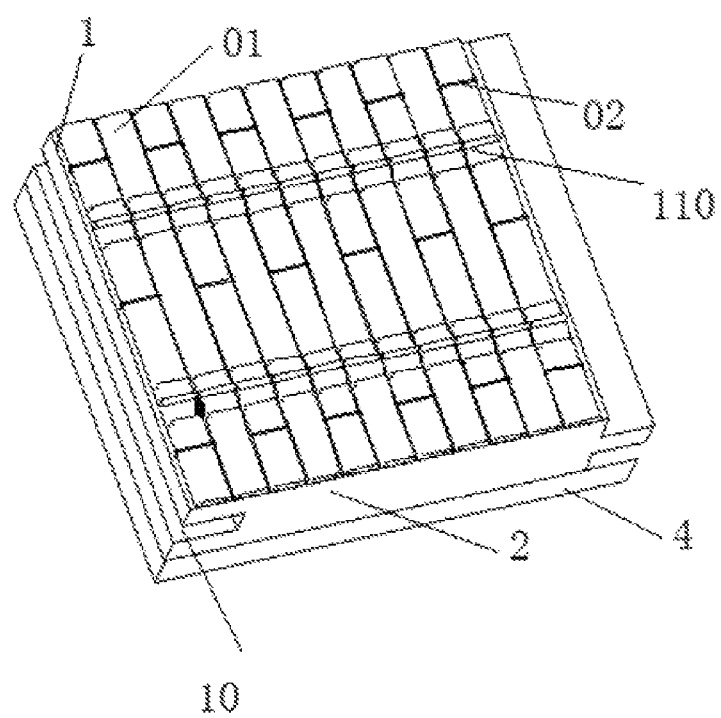
FIG. 13 a schematic view of the composite bamboo floor with the double-layer structure where the bamboo fiber strip connecting pieces across the bamboo fiber strips and are arranged in the vertical direction of one adjacent bamboo fiber strip in a staggered mode of the invention.

As shown in FIG. 13, the floor base board 4 is further arranged under the core board 2 and is a log veneer base board or the floor base board formed by jointly curing a first thermosetting resin and bamboo fiber strips. The inventor experimentally found that if the bamboo fiber strips are hot-pressed on both the front side and the back side, the stability of the composite bamboo floor can be further improved. The floor base board is the hot-pressed woven bamboo fiber strip board, the bamboo fiber strip connecting pieces having their strength in the direction non-parallel to the bamboo fiber strips are arranged on the hot-pressed woven bamboo fiber strip board, and the bamboo fiber strip connecting pieces are arranged in the vertical direction of one or more adjacent bamboo fiber strips in a staggered mode.

For improving the strength of the floor, the first thermosetting resin layer or the second thermosetting resin layer can be arranged between the floor surface board 1 and the core board 2; or the first thermosetting resin layer or a second thermosetting resin layer can be arranged between the floor surface board 1 and the core board 2 and the floor base board 4. The thermosetting resin arranged between the floor surface board and the core board can be the same as or different from the thermosetting resin arranged between the biomass material core board and the base board. When their thermosetting resins are different, different types of thermosetting resins having good mutual fusion properties during hot pressing should be selected.

Embodiment I

A manufacturing method of the composite bamboo floor comprises the following manufacturing steps:

(1) prefabricating the floor surface board: enabling the bamboo fiber strip connecting pieces 02 having their strength in the direction non-parallel to the bamboo fiber strips to across the bamboo fiber strips 01 with a thickness of 1 mm and a width of 1 mm so as to form woven bamboo fiber strip curtains, and dipping the woven bamboo fiber strip curtains with the first thermosetting resin to obtain a prefabricated floor surface board; the width of the woven bamboo fiber strip curtains is 0.6 to 2 m;

(2) performing drying: feeding and drying the prefabricated floor surface board till the moisture content is 6% to obtain a dried floor surface board;

(3) manufacturing the core board;

(4) performing hot pressing: putting the dried floor surface board on the core board, performing hot pressing under the hot pressing pressure of 3 $MPa/cm^2$ and at the hot pressing temperature of 170 degrees C. for the hot pressing time of 20 min to obtain a hot-pressed woven bamboo fiber strip board;

(5) performing conditioning;

(6) performing side cutting: conducting slitting and width fixation on the side faces of the hot-pressed woven bamboo fiber strip board according to the required width of the composite bamboo floor;

(7) performing tenoning.

Figure 14:
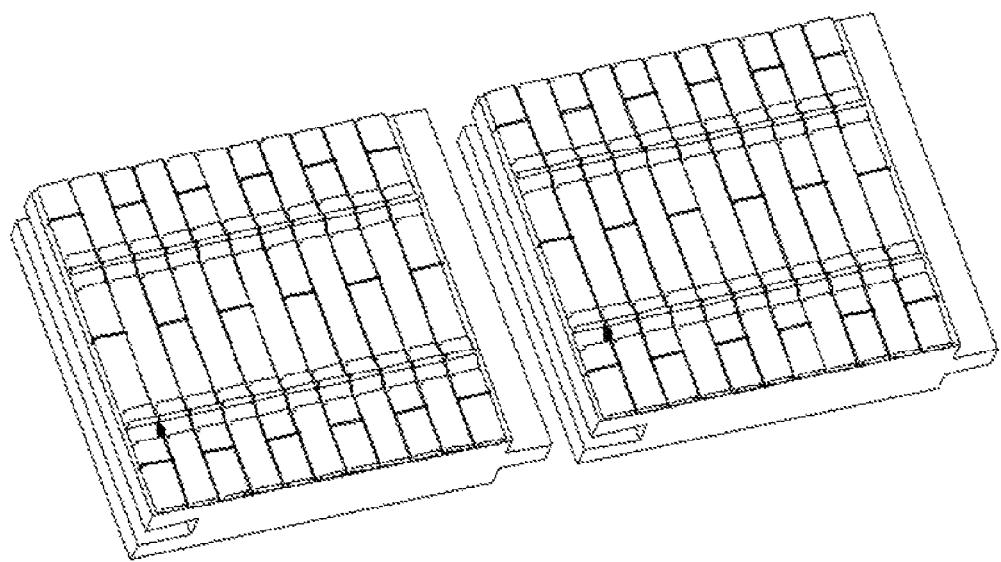
FIG. 14 is a schematic view of mortise joint assembly of the composite bamboo floor of the invention.

When the composite bamboo floor is actually installed and used, tenon-and-mortise assembly is performed as shown in FIG. 14.

Embodiment II

A manufacturing method of the composite bamboo floor comprises the following manufacturing steps:

(1) prefabricating the floor surface board: enabling the bamboo fiber strip connecting pieces 02 having their strength in the direction non-parallel to the bamboo fiber strips to across the bamboo fiber strips 01 with a thickness of 4 mm and a width of 10 mm so as to form woven bamboo fiber strip curtains, and dipping the woven bamboo fiber strip curtains with the first thermosetting resin to obtain a prefabricated floor surface board; the width of the woven bamboo fiber strip curtains is 2 m;

(2) drying: feeding and drying the prefabricated floor surface board till the moisture content is 10% to obtain a dried floor surface board;

(3) manufacturing the core board;

(4) hot pressing: putting the dried floor surface board on the core board, performing hot pressing under the hot pressing pressure of 6 MPa/cm$^2$ and at the hot pressing temperature of 120 degrees C. for the hot pressing time of 10 min to obtain a hot-pressed woven bamboo fiber strip board;

(5) conditioning;

(6) side cutting: conducting slitting and width fixation on the side faces of the hot-pressed woven bamboo fiber strip board according to the required width of the composite bamboo floor;

(7) tenoning.

Embodiment III

A manufacturing method of the composite bamboo floor comprises the following manufacturing steps:

(1) prefabricating the floor surface board: enabling the bamboo fiber strip connecting pieces 02 having their strength in the direction non-parallel to the bamboo fiber strips to across the bamboo fiber strips 01 with a thickness of 2 mm and a width of 15 mm so as to form woven bamboo fiber strip curtains, and dipping the woven bamboo fiber strip curtains with the first thermosetting resin to obtain a prefabricated floor surface board; the width of the woven bamboo fiber strip curtains is 1.5 m;

(2) drying: feeding and drying the prefabricated floor surface board till the moisture content is 8% to obtain a dried floor surface board;

(3) manufacturing the core board;

(4) hot pressing: putting the dried floor surface board on the core board, performing hot pressing under the hot pressing pressure of 5 MPa/cm$^2$ and at the hot pressing temperature of 140 degrees C. for the hot pressing time of 15 min to obtain a hot-pressed woven bamboo fiber strip board;

(5) conditioning;

(6) side cutting: conducting slitting and width fixation on the side faces of the hot-pressed woven bamboo fiber strip board according to the required width of the composite bamboo floor;

(7) tenoning.

Embodiment IV

Similar to Embodiment I, the difference is that the width of the bamboo fiber strips 01 is 99 cm, the first thermosetting resin layer or the second thermosetting resin layer is arranged between the floor surface board 1 and the core board 2; or the first thermosetting resin layer or a second thermosetting resin layer is arranged between the floor surface board 1 and the core board 2 and the floor base board 4.

The first thermosetting resin layer or the second thermosetting resin layer is phenolic resin glue, melamino-formaldehyde resin, urea resin or melamine modified urea resin.

A preparation method of the melamine modified urea resin (modified MUF adhesive) comprises the steps:

A. weighing 100 parts by weight of a formaldehyde water solution with the mass concentration of 36.5%, 0.1 part by weight of an alkali matter solution with the mass concentration of 30% and 0.3 part of amino-terminated hyperbranched polymer PAMAM, putting the materials into a reaction kettle, and starting to perform stirring, wherein the alkali matter is sodium hydroxide, potassium hydroxide, calcium hydroxide, barium hydroxide or ammonia water;

B. adding 1 part by weight of phosphonitrilic chloride trimer, performing heating to reach 50 degrees C., automatically raising the temperature to 75 degrees C., adding 35 parts of the melamine, continuing to raise the temperature to 90 degrees C., and performing the reaction to obtain a preliminary condensation polymer;

C. adding 40 parts of the melamine and 0.6 part of the para toluene sulfonamide in the preliminary condensation polymer to obtain a second condensation polymer;

D. adding 20 parts of the urea when cooling the second condensation polymer to 70 degrees C., continuing to perform reaction for 8 min, and obtaining glue when cooling the temperature to 30 degrees C.

The invention adopts the para toluene sulfonamide and the amino-terminated hyperbranched polymer PAMAM for modification, the urea, the melamine and the formaldehyde are added in a fractionated and staged mode, multi-time feeding is performed to enable the intermediate content of the modified MUF resin adhesive in the preparation process to be maximum, accordingly the strength and abrasion resistance of the board can be improved, and the service life of the board can be prolonged; The MUF resin is modified by utilizing a large amount of reactive functional groups in amino-terminated hyperbranched polymer PAMAM molecules and the highly-branched characteristics of its structure, so that the performance of the resin is improved, the stability is improved, and the free formaldehyde emission is effectively controlled; the formaldehyde emission of the engineered wood processed by adopting the modified MUF adhesive is less than 0.2 mg/L and reaches the Japanese F☆☆☆☆ standard.

Embodiment V

Similar to Embodiment I, the difference is that the first thermosetting resin layer or the second thermosetting resin layer is arranged between the floor surface board 1 and the core board 2; or the first thermosetting resin layer or a second thermosetting resin layer is arranged between the floor surface board 1 and the core board 2 and the floor base board 4.

The first thermosetting resin layer or the second thermosetting resin layer is phenolic resin glue, melamino-formaldehyde resin, urea resin or melamine modified urea resin.

A preparation method of the melamine modified urea resin (modified MUF adhesive) comprises the steps:

A. weighing 100 parts by weight of a formaldehyde water solution with the mass concentration of 37.4%, 0.5 part by weight of an alkali matter solution with the mass concentration of 50% and 0.6 part of amino-terminated hyperbranched polymer PAMAM, putting the materials into a reaction kettle, and starting to perform stirring, wherein the alkali matter is sodium hydroxide, potassium hydroxide, calcium hydroxide, barium hydroxide or ammonia water;

B. adding 1 part by weight of phosphonitrilic chloride trimer, performing heating to reach 55 degrees C., automatically raising the temperature to 85 degrees C., adding 55 parts of the melamine, continuing to raise the temperature to 95 degrees C., and performing the reaction to obtain a preliminary condensation polymer;

C. adding 45 parts of the melamine and 0.9 part of the para toluene sulfonamide in the preliminary condensation polymer to obtain a second condensation polymer;

D. adding 30 parts of the urea when cooling the second condensation polymer to 75 degrees C., continuing to perform reaction for 12 min, and obtaining glue when cooling the temperature to 50 degrees C.

Embodiment VI

Similar to Embodiment I, the difference is that the first thermosetting resin layer or the second thermosetting resin layer is arranged between the floor surface board 1 and the core board 2; or the first thermosetting resin layer or a second thermosetting resin layer is arranged between the floor surface board 1 and the core board 2 and the floor base board 4.

The first thermosetting resin layer or the second thermosetting resin layer is phenolic resin glue, melamino-formaldehyde resin, urea resin or melamine modified urea resin.

A preparation method of the melamine modified urea resin (modified MUF adhesive) comprises the steps:

A. weighing 100 parts by weight of a formaldehyde water solution with the mass concentration of 36.9%, 0.4 part by weight of an alkali matter solution with the mass concentration of 40% and 0.5 part of amino-terminated hyperbranched polymer PAMAM, putting the materials into a reaction kettle, and starting to perform stirring, wherein the alkali matter is sodium hydroxide, potassium hydroxide, calcium hydroxide, barium hydroxide or ammonia water;

B. adding 3 parts by weight of the phosphonitrilic chloride trimer, performing heating to reach 53 degrees C., automatically raising the temperature to 80 degrees C., adding 45 parts of the melamine, continuing to raise the temperature to 92 degrees C., and performing the reaction to obtain a preliminary condensation polymer;

C. adding 43 parts of the melamine and 0.8 part of the para toluene sulfonamide in the preliminary condensation polymer to obtain a second condensation polymer;

D. adding 20-30 parts of urea when cooling the second condensation polymer to 72 degrees C., continuing to perform reaction for 9 min, and obtaining glue when cooling the temperature to 40 degrees C.

Comparative Embodiment

A processing method of the composite floor comprises the following steps that:

Step One: Material Selection

Moso bamboo leftover materials produced in the bamboo material processing process are divided into thin-strip-shaped bamboo filaments and fragmentary bamboo sections, the material selection process is that the bamboo filaments and the bamboo sections are sorted, then water treatment is conducted on the bamboo filaments and the bamboo sections and refers to cooking of the bamboo filaments and the bamboo sections at the temperature of 90 to 160 degrees C. for 3 to 5 hours, the moisture content of the treated bamboo materials is controlled to be 40% to 60%, the water treatment mainly aims at preventing insects and mildew, reducing the hardness of the raw materials, increasing the flexibility of the raw materials, decreasing the waxes on the surfaces of the bamboo materials and improving the adhering strength; after water treatment, the bamboo filaments are selected out and the bamboo sections are sliced to obtain bamboo debris through processing;

Step Two: Bamboo Filament Processing

The bamboo filaments are sorted into various specifications according to the length and thickness and are bundled into bundles, the bamboo filaments similar in length and thickness are used for processing the corresponding specifications of bamboo filament layers; the bundled bamboo filaments are put in a drying room, drying is performed to enable the moisture content to be 10% to 15%, and the bamboo filaments are natural-colored;

the dried bamboo filaments are put into a carbonizing oven for carbonization, different carbonization degrees can be controlled by controlling the temperature and the time, and the carbonized bamboo filaments are light brown or dark brown;

the dried and carbonized bamboo filaments are subjected to gum dipping with urea, phenolic glue or melamine glue and then are dried, the glue content accounts for 2% to 6% of the total weight of the raw materials, and the moisture content is 8% to 15%;

Step Three: Processing of Bamboo Debris the bamboo debris are put in the drying room, drying is performed to enable the moisture content to be 10% to 15%, a glue spraying application method is adopted for the bamboo debris, the urea, phenolic glue or melamine glue is sprayed on the surfaces of the debris through glue spraying holes formed in an upper cover of a glue mixing machine in atomized mode, the glue liquid can gradually tend to uniform distribution on the surfaces of the debris through stirring performed by a stirrer, the glue content accounts for 8% to 15% of the total weight of the bamboo debris, and the bamboo debris coated with the glue stand at normal temperature for about half an hour;

Step Four: Processing of Composite Bamboo Filament Board

The bamboo filament weight required by each bamboo filament layer and the bamboo debris weight required by each bamboo debris layer are calculated according to the volume and density of the composite bamboo filament board to be manufactured, a detachable box or frame type mold is manufactured, a single layer of the bamboo filaments is put into the mold, a layer of the bamboo debris is laid on the single layer of the bamboo filaments, then a layer of the bamboo filaments is laid on the bamboo debris, the bamboo filament layer is superposed with the bamboo debris layer in a staggered mode, the bamboo filaments and the bamboo debris are compactly put in the mold by slightly exerting shake to form a primary composite bamboo filament board blank, the mold is opened, then the primary composite bamboo filament board blank is bundled and fixed, and the thickness of a band for bundling is preferably 0.3 to 0.5 mm;

the primary composite bamboo filament board blank is put in a hot-pressing machine to perform hot-pressing curing formation, the temperature is controlled to be 85 to 180 degrees C., the time is 6 to 20 minutes, the thicker the primary composite bamboo filament board blank is, the longer the required time is, and on the contrary, the thinner the primary composite bamboo filament board blank is, the shorter the required time is, the bundling band is removed, the formed composite bamboo filament board is transferred to a greenhouse to perform thermosetting, the temperature is controlled to 150 to 200 degrees C., and the time is 3 to 8 hours;

Step Five: Edge Sawing and Sanding

The hot-pressed rough-edged composite bamboo filament board is cooled and then is sawed into various specifications of composite bamboo filament boards, and sanding is conducted on the composite bamboo filament board.

The preferred embodiments of the invention are only used for describing the invention rather than for limiting the invention, but the skilled in the art can make modifications having no creative contribution to the embodiments as required after reading the description, which will be protected by patent law as long as in the scope of the claims of the invention.

What is claimed is:

1. A composite bamboo floor comprising a floor surface board formed by jointly curing a first thermosetting resin and multiple bamboo fiber strips, and a core board arranged under the floor surface board;

wherein the floor surface board is provided with a body, a pressed surface exposed for showing bamboo joint shapes, a connecting surface connected with the core board, at least one surface board side face provided with notch structures formed through cutting, and surface board end faces;

wherein the core board is provided with a core board surface connected with the floor surface board, a core board bottom surface opposite to the core board surface, core board side faces parallel to or connected with

TABLE 1

Technical Parameters of Products of Embodiments and Comparative Embodiments

| Test Embodiment item | Moisture content (%) | Density (g/cm$^3$) | Water absorption thickness expansion rate (%) | Static bending strength (MPa) | | Elasticity modulus (MPa) | Formaldehyde emission limit (mg/L) | Cost |
|---|---|---|---|---|---|---|---|---|
| I | 6.2 | 1.29 | 0.922 | along the grain | ≥85 | ≥7500 | ≤0.2 | 30% |
| | | | | across the grain | ≥65 | ≥5000 | | |
| II | 6.1 | 1.3 | 0.931 | along the grain | ≥88 | ≥7800 | ≤0.2 | 28% |
| | | | | across the grain | ≥67 | ≥5200 | | |
| III | 6 | 1.31 | 0.928 | along the grain | ≥89 | ≥7900 | ≤0.2 | 29% |
| | | | | across the grain | ≥68 | ≥5300 | | |
| IV | 6.1 | 1.35 | 0.894 | along the grain | ≥86 | ≥8000 | ≤0.2 | 31% |
| | | | | across the grain | ≥66 | ≥3000 | | |
| V | 6.1 | 1.36 | 0.938 | along the grain | ≥87 | ≥7700 | ≤0.2 | 26% |
| | | | | across the grain | ≥62 | ≥5700 | | |
| VI | 6.3 | 1.37 | 0.941 | along the grain | ≥89 | ≥7500 | ≤0.2 | 32% |
| | | | | across the grain | ≥63 | ≥8100 | | |
| Comparative Embodiment | 7.1 | 1.27 | 0.952 | along the grain | ≥60 | ≥3000 | ≤1.5 | 100% |
| | | | | across the grain | ≥30 | ≥2500 | | | the surface board side faces and core board end faces parallel to or connected with the surface board end faces;

wherein positions along the length of the side faces of the core board or positions along the length of the surface board are provided with notch structures processed in two sides in the length direction of the composite bamboo floor, and wherein the notch structures provided in the at least one surface board side face are processed in the length direction of the composite bamboo floor;

wherein the multiple bamboo fiber strips are arranged in an approximate parallel mode such that each bamboo fiber strip comprises of a length that extends between the surface board end faces, the floor surface board further comprising bamboo fiber strip connecting pieces extending across and penetrating through respective bamboo fiber strips and having strength in a direction non-parallel to the bamboo fiber strips, wherein the bamboo fiber strip connecting pieces are arranged at different locations along the length of one or more adjacent bamboo fiber strips at intervals of one or more bamboo fiber strips so as to form an alternating pattern across the floor surface board of bamboo fiber strips with bamboo fiber strip connecting pieces extending therethrough and bamboo fiber strips without bamboo fiber strip connecting pieces extending therethrough;

and wherein the first thermosetting resin layer or a second thermosetting resin layer is arranged between the floor surface board and the core board; and the first thermosetting resin layer or a second thermosetting resin layer is arranged between the core board and a floor base board;

wherein the first thermosetting resin layer and the second thermosetting resin layer are melamine modified urea resin, wherein the melamine modified urea resin comprising the following materials with respective amount thereof:
- 100 parts by weight of a formaldehyde water solution with the mass concentration of 36.5% to 37.4%, 0.1-0.5 parts by weight of an alkali matter solution with the mass concentration of 30% to 50% and 0.3-0.6 parts of amino-terminated hyperbranched polymer PAMAM;
- 1-4 parts by weight of phosphonitrilic chloride trimer;
- 75-100 parts by weight of the melamine;
- 0.6-0.9 parts by weight of para toluene sulfonamide;
- 20-30 parts of urea.

2. The composite bamboo floor of claim 1, characterized in that the core board is a biomass material core board selected from a fiber board, a particle board, an engineered wood veneer or woven fir strip curtains or woven bamboo fiber strip curtains with a block shape for each of the strip curtains and having a thickness.

3. The composite bamboo floor of claim 1, characterized in that the bamboo fiber strip connecting pieces are bamboo filaments, cotton threads or thin iron wires.

* * * * *